(12) United States Patent
Handigol et al.

(10) Patent No.: US 10,589,642 B2
(45) Date of Patent: Mar. 17, 2020

(54) EASY-ENTRY VEHICLE SEAT

(71) Applicant: BROSE FAHRZEUGTEILE GMBH & CO. KOMMANDITGESELLSCHAFT, COBURG, Coburg (DE)

(72) Inventors: Umesh Handigol, Rochester, MI (US); Ulf Hartmann, Lake Orion, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 15/813,820

(22) Filed: Nov. 15, 2017

(65) Prior Publication Data
US 2019/0143851 A1 May 16, 2019

(51) Int. Cl.
*B60N 2/30* (2006.01)
*B60N 2/20* (2006.01)
*B60N 2/16* (2006.01)
*B60N 2/12* (2006.01)
*B60N 2/07* (2006.01)
*B60N 2/06* (2006.01)

(52) U.S. Cl.
CPC .......... *B60N 2/20* (2013.01); *B60N 2/06* (2013.01); *B60N 2/07* (2013.01); *B60N 2/12* (2013.01); *B60N 2/16* (2013.01); *B60N 2/1615* (2013.01)

(58) Field of Classification Search
CPC ........ B60N 2/12; B60N 2/3065; B60N 2/309; B60N 2/3013; B60N 2/36; B60N 2/20; B60N 2/206
See application file for complete search history.

(56) References Cited

U.S. PATENT DOCUMENTS 4,269,446 A  5/1981 Gersmann et al.
5,588,707 A  12/1996 Bolsworth et al.
(Continued)

FOREIGN PATENT DOCUMENTS

DE  1780387 A1  1/1972
DE  2813534 C2  10/1979
(Continued)

OTHER PUBLICATIONS

Partial International Search Report dated Mar. 4, 2019, Application No. PCT/EP2018/081054, 13 pages.
(Continued)

*Primary Examiner* — Shin H Kim
(74) *Attorney, Agent, or Firm* — Lewis Roca Rothgerber Christie LLP

(57) ABSTRACT

The invention relates to a vehicle seat comprising: a seating portion having a seat frame; a backrest portion pivotably supported on the seating portion; a seat base for supporting the seating portion; and an easy-entry mechanism for displacing the seating portion and the backrest portion with respect to the seat base at least along a longitudinal axis between a use position and an easy-entry position, the easy-entry mechanism comprising: at least one arm pivotably connected with the seat frame and pivotably connected to the seat base at a first position; and at least one sliding pivot joint for supporting the seat frame on the seat base at a second position, the first position being spaced apart from the second position along the longitudinal axis.

19 Claims, 6 Drawing Sheets

(56) References Cited

U.S. PATENT DOCUMENTS

| | | | |
|---|---|---|---|
| 5,662,368 A | 9/1997 | Ito et al. | |
| 5,683,140 A | 11/1997 | Roth et al. | |
| 5,979,985 A | 11/1999 | Bauer et al. | |
| 6,030,042 A | 2/2000 | Bauer et al. | |
| 6,382,718 B1 | 5/2002 | Janke et al. | |
| 7,300,109 B2 | 11/2007 | Hofmann et al. | |
| 7,686,397 B2 | 3/2010 | Sahi | |
| 9,145,071 B2* | 9/2015 | Bohm | B60N 2/22 |
| 9,511,687 B2* | 12/2016 | Seibold | B60N 2/163 |
| 9,944,204 B2* | 4/2018 | Salvia, III | B60N 2/206 |
| 2002/0060487 A1 | 5/2002 | Makosa | |
| 2004/0051361 A1 | 3/2004 | Rausch et al. | |
| 2004/0075322 A1 | 4/2004 | Jaeger et al. | |
| 2005/0110323 A1 | 5/2005 | Hofmann et al. | |
| 2006/0145524 A1 | 7/2006 | Fischer et al. | |
| 2008/0030060 A1 | 2/2008 | Schwingenschlogel et al. | |
| 2010/0052390 A1* | 3/2010 | Dagcioglu | B60N 2/3011 297/324 |
| 2010/0194134 A1 | 8/2010 | Ehrhard et al. | |
| 2010/0289313 A1* | 11/2010 | Moegling | B60N 2/3013 297/332 |
| 2011/0316317 A1 | 12/2011 | Sprenger et al. | |
| 2013/0069405 A1 | 3/2013 | Schehl et al. | |
| 2013/0320736 A1 | 12/2013 | Teufel et al. | |
| 2015/0375643 A1* | 12/2015 | Fisher | B60N 2/015 297/334 |
| 2016/0318424 A1 | 11/2016 | Dlugokecki et al. | |
| 2018/0141476 A1* | 5/2018 | Tobata | B60N 2/90 |
| 2018/0215288 A1* | 8/2018 | Hiemstra | B60N 2/20 |

FOREIGN PATENT DOCUMENTS

| | | |
|---|---|---|
| DE | 19646470 B4 | 5/1998 |
| DE | 19860234 C1 | 5/2000 |
| DE | 10020923 A1 | 12/2001 |
| DE | 20015115 U1 | 1/2002 |
| DE | 10057660 C1 | 4/2002 |
| DE | 10057724 B4 | 5/2002 |
| DE | 10355765 A1 | 6/2005 |
| DE | 102004057471 B4 | 6/2006 |
| DE | 102005017403 B4 | 10/2006 |
| DE | 102005050742 B4 | 4/2007 |
| DE | 102006002823 B4 | 8/2007 |
| DE | 102007012429 B4 | 9/2008 |
| DE | 102008057641 A1 | 5/2010 |
| DE | 102010040424 A1 | 5/2011 |
| DE | 102011018330 B4 | 10/2012 |
| DE | 102013205459 B4 | 10/2014 |
| DE | 102013225123 A1 | 6/2015 |
| DE | 102014225692 B4 | 3/2016 |
| DE | 102015222133 A1 | 5/2017 |
| EP | 0120817 | 10/1984 |
| EP | 1397269 B1 | 3/2006 |
| EP | 1615796 B1 | 2/2008 |
| EP | 1892143 A2 | 2/2008 |
| EP | 2028039 B1 | 10/2015 |
| FR | 2917679 | 12/2008 |
| GB | 2051569 A | 1/1981 |
| WO | WO 2011/120612 A1 | 10/2011 |
| WO | WO 2015/082672 A1 | 6/2015 |
| WO | WO 2017/080976 A1 | 5/2017 |

OTHER PUBLICATIONS

International Search Report dated Jun. 4, 2019, Application No. PCT/EP2018/081054, Jun. 4, 2019, 20 pages.

* cited by examiner

EASY-ENTRY VEHICLE SEAT

FIELD

The present invention relates to a vehicle seat having an easy-entry mechanism.

BACKGROUND

Vehicle seats with easy-entry mechanisms may be used, e.g., to provide a comfortable access for occupants to a second row in two-door vehicles or a third row in four-door vehicles. For this purpose, the vehicle seat may be displaced between a use position and an easy-entry position. Mechanisms are known in which a backrest portion of the vehicle seat is folded forward towards a seating portion, or in which the vehicle seat is longitudinally displaced by means of guide rails that also provide a longitudinal adjustment of the vehicle seat in the use position. In case of vehicle seats being adjusted by an actuator, e.g. an electric motor, the displacement of the vehicle seat between the use position and the easy-entry position is often slow and after activation of the mechanism the occupants may have to wait to enter or exit the vehicle, or to take a seat in the use position. When the easy-entry mechanism shall be designed such that by returning into the use position, the vehicle seat comfortably assumes its previously adjusted longitudinal position, complex memory devices may become necessary.

DE 10 2015 222 133 A1 describes a vehicle seat with an easy-entry mechanism, wherein the backrest portion and the seating portion are separately supported on a seat base leading to a complex arrangement. A height-adjustment is not possible in the vehicle seat.

SUMMARY

It is an object to provide an improved vehicle seat with an easy-entry mechanism.

According to a first aspect, a vehicle seat, in particular for a motor vehicle, comprises a seating portion having a seat frame. The seat frame may have a frame member. An occupant may take a seat on the seating portion. The vehicle seat further comprises a backrest portion pivotably supported on the seating portion, in particular pivotably supported by the seat frame. The occupant may lean his or her back against the backrest portion when sitting on the seating portion. The vehicle seat further comprises a seat base adapted for supporting the seating portion. The seat base supports the backrest portion via the seating portion. The vehicle seat further comprises an easy-entry mechanism adapted for displacing the seating portion together with the backrest portion with respect to the seat base at least along a longitudinal axis between a use position and an easy-entry position. In the use position, the occupant may take a seat on the vehicle seat. In the easy-entry position, access into a row of seats behind the vehicle seat may be facilitated, in particular by at least partially clearing the space occupied by the backrest portion in the use position. The easy-entry mechanism comprises an arm pivotably connected with the seat frame, in particular with the frame member of the seat frame, and pivotably connected to the seat base at a first position. The easy-entry mechanism further comprises a sliding pivot joint adapted for supporting the seat frame on the seat base at a second position. It is provided that the first position is spaced apart from the second position at least along the longitudinal axis.

Such an improved vehicle seat may be designed less complex than known vehicle seats having easy-entry mechanisms. Further, such a vehicle seat allows the provision of a height-adjustment mechanism and/or a longitudinal adjustment mechanism that does/do not interfere with the easy-entry mechanism. In particular, operating the easy-entry mechanism does not necessarily readjust a longitudinal vehicle seat adjustment mechanism. Therefore, no memory device for storing the longitudinal position before displacement in the easy-entry position is necessary. The complexity of the vehicle seat may thus be further reduced.

The sliding pivot joint may particularly be designed such that a pivot axis of the sliding pivot joint intersects a sliding path of the sliding pivot joint, in particular at all points along the path. The intersection may be orthogonal.

The easy-entry mechanism may be manually operable, or it may comprise a motor to displace the vehicle seat from the use position into the easy-entry position and vice-versa. The motor may be self-locking or non-self-locking.

In one embodiment, the sliding pivot joint comprises a slotted bracket mounted on the seat base or forming a part of the seat base. The slot of the slotted bracket may be engaged by a bolt or pin such that the bolt or pin is be slidable along the slot and rotatable within the slot. The slot may define the sliding path.

In one embodiment, the vehicle seat further comprises a height-adjustment mechanism adapted for adjusting the height of the seat frame with respect to the seat base. The height-adjustment mechanism may be coupled to the easy-entry mechanism, or it may be part of the easy-entry mechanism. Height adjustment may increase the comfort of the vehicle seat and may improve the security, since occupants of different height may adjust the seat for an optimal field of vision.

In one embodiment, a height-adjustment link of the height-adjustment mechanism is provided and arranged to connect the sliding pivot joint with the frame member. The height-adjustment link may support the frame member of the seat frame on the sliding pivot joint. A height-adjustment link may be easily constructed such as to withstand strong forces. The height-adjustment link may be formed as a swing arm. A pivot bolt mounted on the height-adjustment link may be pivotably and slidably attached to the slotted bracket.

In one embodiment, the height-adjustment link is rotatably mounted on the seat base, in particular by means of the sliding pivot joint. A rotation of the height-adjustment link with respect to the seat base may effect a height adjustment of the seating portion together with the backrest portion.

In one embodiment, the vehicle seat further comprises a guide rail assembly mounted or mountable on a vehicle floor. The guide rail assembly is adapted for adjusting the longitudinal position of the seat base and/or of the seating portion and the backrest portion with respect to the vehicle floor. The easy-entry mechanism may displace the vehicle seat between the use position and the easy-entry position without adjusting the guide rail assembly. The vehicle seat may comprise a motor for longitudinal adjustment of the vehicle seat. The easy-entry mechanism may move the vehicle seat from the use position into the easy-entry position and vice-versa without activating such longitudinal adjustment motor. The easy-entry mechanism may move the vehicle seat from the use position into the easy-entry position and vice-versa particularly quickly, because it is not necessary to activate the longitudinal adjustment motor, which may, e.g., be adapted to provide a precise but slow adjustment.

In one embodiment, the seat base is mounted on an upper rail of the guide rail assembly, or it may comprise the upper rail of the guide rail assembly. The guide rail assembly may comprise the upper rail and a lower rail, wherein the upper rail is slidably engaged with the lower rail. The lower rail may be mounted or mountable on the vehicle floor.

In one embodiment, the easy-entry mechanism further comprises a releasable latch for restricting and releasing a slidable motion of the slidable pivot joint. In this manner, the vehicle seat may be secured in the use position.

In one embodiment, the latch is releasable by pivoting the backrest portion with respect to the seating portion. By this, the displacement of the vehicle seat from the use position into the easy-entry position may be effected in a particular easy and intuitive manner.

In one embodiment, the easy-entry mechanism further comprises a releasable cam lock for restricting and releasing a slidable motion of the slidable pivot joint. In this manner, the vehicle seat may be secured in the use position.

In one embodiment, the cam lock is releasable by pivoting the backrest portion with respect to the seating portion. By this, the displacement of the vehicle seat from the use position into the easy-entry position may be effected in a particular easy manner.

In one embodiment, a recliner pivotably connects the backrest portion with the seating portion. By means of the recliner, an angle of the backrest portion with respect to the seating portion may be adjusted.

In one embodiment, the sliding pivot joint is located closer to the recliner than the arm, in particular when seen along the longitudinal axis. This may provide particularly effective kinematics of the easy-entry mechanism.

In one embodiment, the backrest portion is adjustable with respect to the seating portion by means of the recliner without displacing the seating portion with respect to the seat base. Therefore, backrest portion angle and the seating portion longitudinal position may be adjusted separately without interfering with one another. This allows for an intuitive and easy adjustment of the vehicle seat.

In one embodiment, the recliner includes a first recliner part fixed to the seat frame and a second recliner part fixed to a backrest frame of the backrest portion so that the backrest portion is supported by and mounted on the seating portion. The first recliner part and the second recliner part may be rotataby mounted to one another. The first and second recliner parts may be engaged with each other. The first and second recliner parts may be recliner fittings.

In one embodiment, the first recliner part is mounted to the frame member of the seat frame. The frame member may be formed as a single part, or it may comprise a plurality of parts which are fixed to one another. The frame member may particularly be a side member.

In one embodiment, the easy-entry mechanism further comprises one or more springs arranged such as to pre-tension the seating portion in direction of the easy-entry position. By this, the vehicle seat may simply be moved into the easy-entry position by unlocking a lock, e.g., the releasable latch or cam lock, and by applying no or only little force onto the vehicle seat, because once unlocked, the motion of the vehicle seat is effected or assisted by the spring or springs.

In one embodiment, the seat frame comprises two frame members being laterally spaced from one another and connected with each other, e.g. by rods. The frame members may be side members.

In one embodiment, the vehicle seat further comprises a second arm. Both arms are pivotably mounted on one of the frame members at one end of the respective arm and on the seat base on the other end of the respective arm. The vehicle seat may further comprise a second sliding pivot joint adapted for supporting the seat frame on the seat base. Each sliding pivot joint may be arranged below one of the frame members of the seat frame.

According to a second aspect, a vehicle seat is provided, the vehicle seat comprising a seating portion having a seat frame with a pair of frame members; a seat base adapted for supporting the seating portion; a height-adjustment mechanism adapted for adjusting the height of the seat frame with respect to the seat base; and an easy-entry mechanism adapted for displacing the seating portion with respect to the seat base along a longitudinal axis between a use position and an easy-entry position. The easy-entry mechanism comprises two sliding pivot joints, each sliding pivot joint being adapted for supporting the seat frame on the seat base. Each frame member is connected to its corresponding sliding pivot joint via a height-adjustment link of the height-adjustment mechanism.

The height of the seat frame with respect to the seat base may be adjusted by pivoting the height-adjustment link or height-adjustment links with respect to at least one of the seat base and the seat frame.

The easy-entry mechanism may comprise two arms, each arm being pivotably connected with one of the frame members, and pivotably connected with the seat base at first positions on the seat base. Each sliding pivot joint may support the seat frame on the seat base at a second position, each first position being spaced apart from the respective second position along the longitudinal axis.

The improved vehicle seat according to the second aspect may obviously be combined with a vehicle seat according to the first aspect. Accordingly, features mentioned above with respect to an embodiment of a vehicle seat according to the first aspect may also be implemented in an embodiment of a vehicle seat according to the second aspect and vice versa.

BRIEF DESCRIPTION OF THE DRAWINGS

The previously mentioned and other advantages of the present solution will be apparent to those skilled in the art upon consideration of the following specification and the attached drawings.

DETAILED DESCRIPTION

Figure 1:
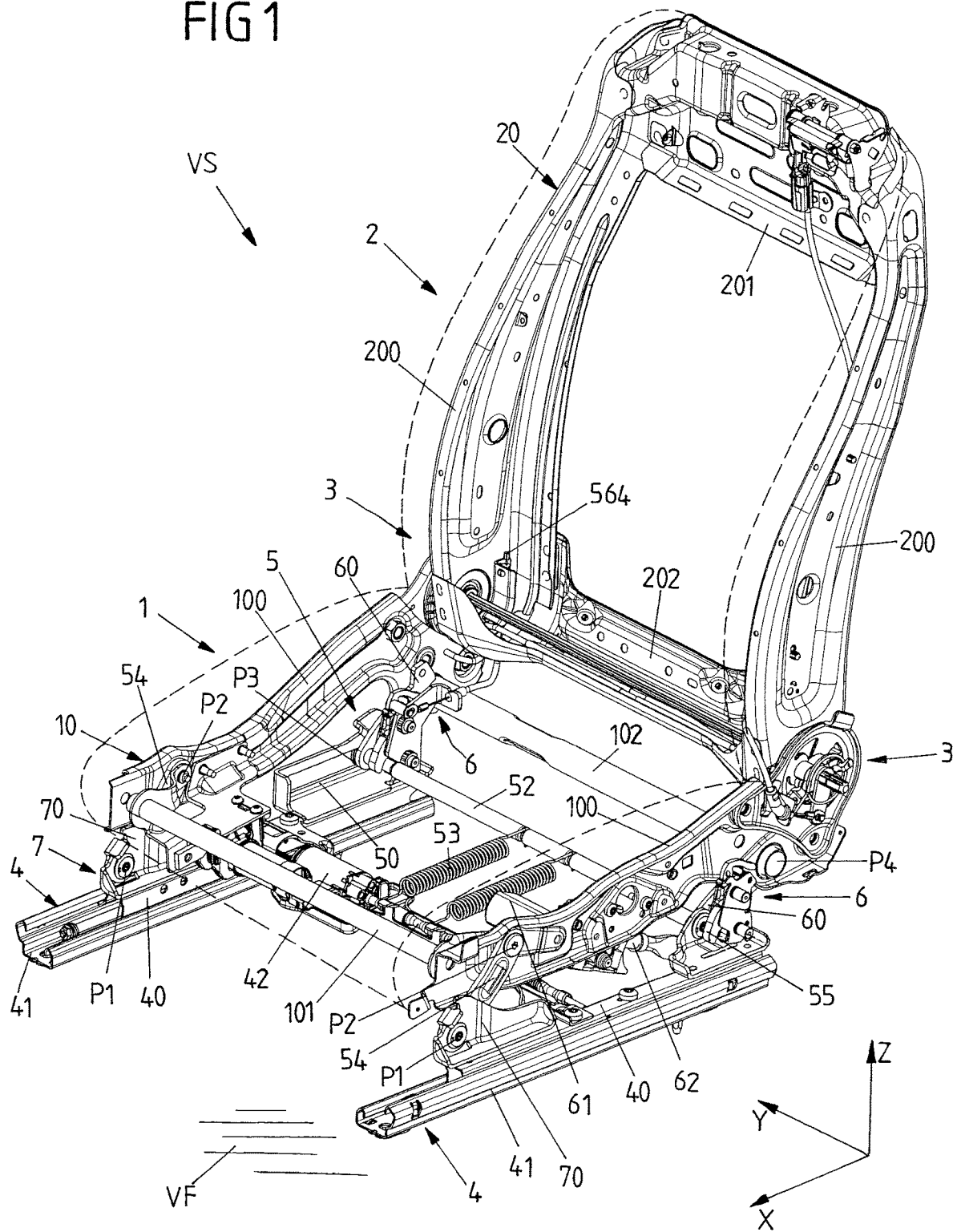
FIG. 1 is a perspective view on a vehicle seat having a manually operable easy-entry mechanism with a releasable latch.

FIG. 1 shows a vehicle seat VS having a seating portion 1 and a backrest portion 2. The seating portion 1 comprises a seat frame 10. The seat frame 10 is adapted for supporting a seat cushion for an occupant. The backrest portion 2 comprises a backrest frame 20. The backrest frame 20 is adapted for supporting a backrest cushion for the occupant.

The seat and backrest cushions are indicated with dashed lines. The backrest frame 20 is mounted on the seat frame 10 by means of a pair of recliners 3.

The seat frame 10 comprises two frame members 100 arranged at the sides of the seating portion 1. The frame members 100 are connected to one another by a front rod 101 and a rear rod 102. The front and rear rods 101, 102 are arranged between the frame members 100. The frame members 100 will be referred to as side members 100 in the following. The side members 100 are elongate and generally extend along a longitudinal axis X. The front and rear rods 101, 102 generally extend along a lateral axis Y orthogonal to the longitudinal axis X. The backrest frame 20 comprises two side members 200 being connected to one another by means of an upper crossbar 201 and a lower crossbar 202.

The vehicle seat VS is adjustable in six directions. The angle of the backrest portion 2 with respect to the seating portion 1 is adjustable (forwards and backwards, around the lateral axis Y) by means of the recliners 3. A longitudinal position of the seating portion 1 and the backrest portion 2 along the longitudinal axis X with respect to a vehicle floor VF of a vehicle, to which the vehicle seat VS is mounted, is adjustable (forwards and backwards) by means of a guide rail assembly 4. A height of the seating portion 1 and the backrest portion 2 with respect to the vehicle floor VF along a vertical axis Z or within the XZ plane is adjustable (upwards and downwards) by means of a height-adjustment mechanism 6.

The longitudinal axis X, the lateral axis Y and the vertical axis Z together form a rectangular coordinate system.

The vehicle seat VS comprises a seat base 7. Seat base 7 includes a pair of front brackets 70. An upper rail 40 of the guide rail assembly 4 is also part of the seat base 7. Alternatively, the vehicle floor may serve as seat base, e.g., when no guide rail assembly 4 is provided. The front brackets 70 are fixed to the upper rail 40.

The vehicle seat VS further comprises an easy-entry mechanism 5. By means of the easy-entry mechanism 5, the seating portion 1 together with the backrest portion 2 may be displaced with respect to the seat base 7. In particular, the seating portion 1 and the backrest portion 2 are displaceable between a use or design position and an easy-entry position. In the use position, an occupant may take a seat on the vehicle seat VS. In the easy-entry position, the seat is moved forward along the longitudinal axis X in order to provide a free space for an occupant to enter a part of the vehicle behind the vehicle seat VS. Before the easy-entry mechanism 5 will be described in more detail below with reference to FIGS. 1 and 2, the adjustment of the recliners 3, of the guide rail assembly 4 and of the height-adjustment mechanism 6 will be described.

For adjusting the angle of the backrest portion 2 with respect to the seating portion 1, each of the two recliners 3 comprises a first recliner fitting fixedly connected to the seat frame 10 (more precisely, to one of the side members 100 of the seat frame 10), and a second recliner fitting, fixedly connected to the backrest frame 20 (more precisely, to one of the side members 200 of the backrest frame 20). One or both of the recliners 3 may be locked at different angular positions of the first recliner fitting with respect to the second recliner fitting. A drive motor may be provided for adjusting the angular position.

For adjusting the longitudinal position of the vehicle seat VS, guide rail assembly 4 comprises two upper rails 40, each of which being slidably engaged with a respective lower rail 41. The lower rails 41 are connectable or connected with the vehicle floor VF, e.g. by means of bolts. In the example shown in FIG. 1, the guide rail assembly 4 comprises a drive motor 42. The drive motor 42 drives a spindle nut to rotate along a spindle in direction of the longitudinal axis X.

For adjusting the height of the seating portion 1 and the backrest portion 2, the vehicle seat VS comprises a four-bar linkage. As shown in FIG. 1, the vehicle seat VS comprises four-bar linkage on both (left and right) sides of the vehicle seat VS. Each four-bar linkage comprises an arm 54 (or swing arm) and a height-adjustment link 60. On both sides, the arm 54, height-adjustment link 60, seat frame 10 side member 100 and upper rail 40 together form the four-bar linkage. Each four-bar linkage comprises four pivot bearings P1-P4. The arms 54 are pivotably mounted with one end on the front brackets 70 at a first pivot bearing P1. The respective other end of each of the arms 54 is pivotably mounted on the corresponding seat frame 10 side member 100 at a second pivot bearing P2, in the example shown in FIG. 1 in the region of the front end of the side member 100. The height-adjustment links 60 each are pivotably mounted at a slotted bracket 50 of the easy-entry mechanism 5. The slotted bracket 50 is fixed to the corresponding upper rail 40, in particular to a rear-end region thereof. Within the slotted bracket 50 a bolt 51 is pivotably (and slidably) mounted, thus forming a third pivot bearing P3. At their respective end opposite the slotted bracket 50, the height-adjustment links 60 are fixed to the rear rod 102 of the seat frame 10. The rear rod 102 is rotatably connected with the side members 100 at a fourth pivot bearing P4. Alternatively, the rear rod 102 may be fixedly connected to the side members 100 and the height-adjustment links 60 may be pivotably mounted on the rear rod 102 at a fourth pivot bearing.

By pivoting the arms 54 and the height-adjustment links 60 forward or backward, the seat frame 10 describes a combined movement within the XZ plane with respect to the seat base 7 and is lifted upwards (and forwards) or downwards (and backwards), respectively, so as to adjust the height of the vehicle seat VS. The height-adjustment mechanism 6 comprises a drive motor 61 to effect the height-adjustment. The drive motor 61 is fixedly mounted on one of the seat frame 10 side members 100. The drive motor 61 longitudinally displaces a spindle 62. The spindle 62 is pivotably connected with one of the height-adjustment links 60 at a position eccentric from the pivot axis of the height-adjustment link 60 on the slotted bracket 50 (the right slotted bracket is not shown in FIG. 1 but arranged symmetrically to the left slotted bracket 50). This height-adjustment link 60 may have an L-shaped configuration with a pivot bearing (the third pivot bearing P3) located at the corner of the L-shape, the connection to the cross member 102 at the end of the long part of the L-shape and the connection to the spindle 62 at the end of the short part of the L-shape.

By displacing the spindle 62 by means of the drive motor 61, the height-adjustment link 60 is rotated to effect height adjustment. Alternatively or in addition to a drive motor the height-adjustment mechanism 6 may be manually operable. For example, the spindle 62 may be manually operable, e.g. by rotating a spindle nut engaging the spindle. Alternatively or in addition to a spindle mechanism, the height-adjustment mechanism 6 may comprise another type of drive mechanism, e.g., a pinion drive mechanism. The pinion may drive along a toothed rack. The pinion drive may be powered by a motor or driven manually.

Figure 2:
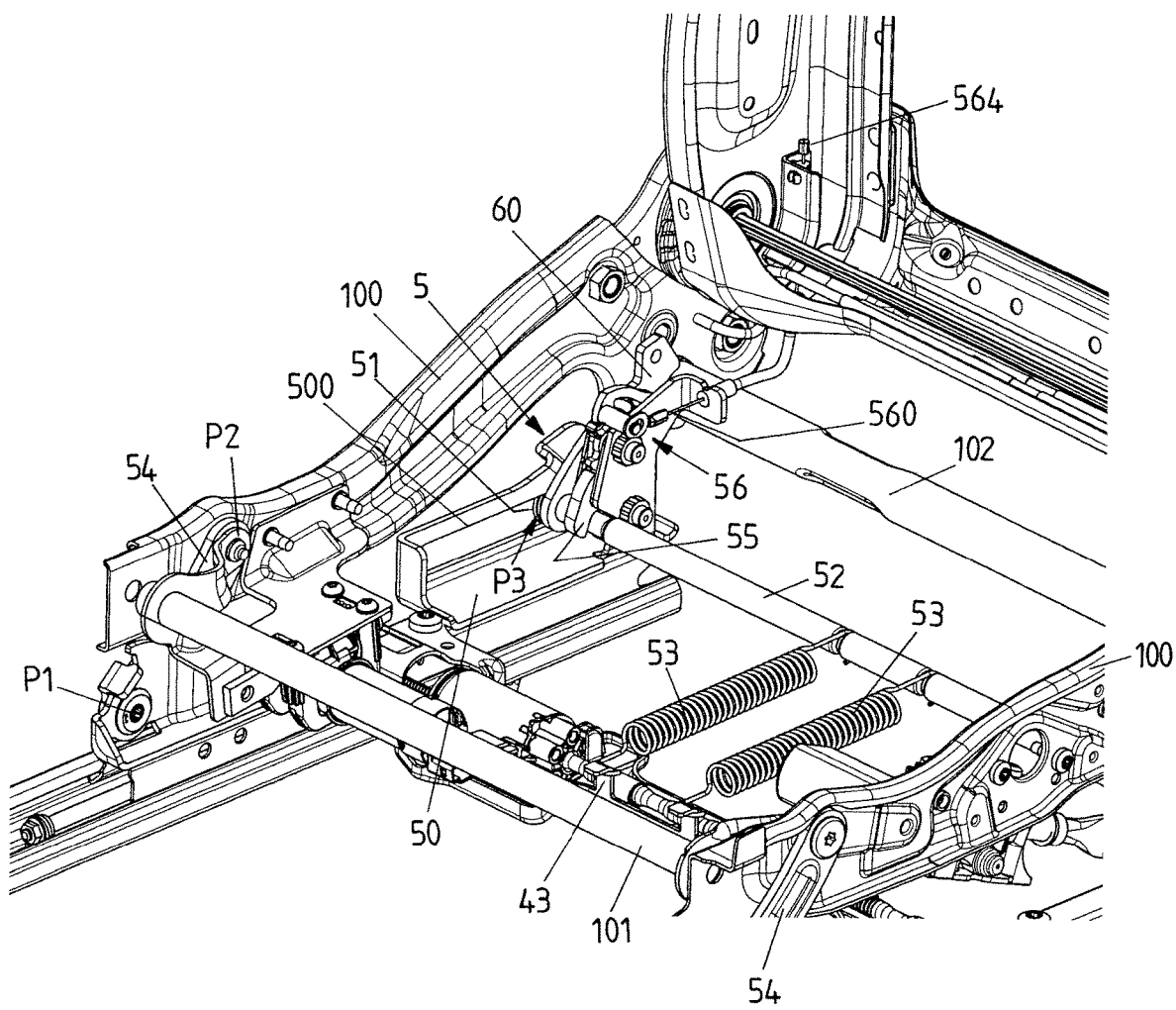
FIG. 2 is an enlarged perspective view on a detail of the easy-entry mechanism of the vehicle seat according to FIG. 1.

FIG. 2 particularly shows the easy-entry mechanism 5 in more detail. On both sides of the vehicle seat VS, the easy-entry mechanism 5 comprises a bolt 51 or pin or wheel which engages an elongate slot 500 of the slotted bracket 50. In the example according to FIGS. 1 and 2, the elongate slot 500 or hole generally describes a straight line. The straight line extends along the longitudinal axis X. Alternatively, the elongate slot 500 may describe a curve. The bolts 51 are fixedly connected to one another by means of a synchronization tube 52. The bolts 51 and the synchronization tube 52 are arranged coaxially (and in parallel to the longitudinal axis Y). In an alternative configuration, the synchronization tube 52 may be omitted.

The bolts 51 and the elongate hole 500 together form a sliding pivot joint. The sliding pivot joint allows a translational motion and a rotational motion. The rotational motion allowed by the sliding pivot joint is about an axis vertical to the allowed translational motion. The translational motion is along the longitudinal axis X. The rotational motion is about an axis parallel to the lateral axis Y.

The sliding pivot joint supports the seat frame 10 (and, in turn, the backrest frame 20). The sliding pivot joint connects the seat frame 10 with the seat base 7, in particular with the upper rail 40. The slotted bracket 50, or a base plate thereof, may be regarded as forming a part of the seat base 7.

On each side of the vehicle seat VS, the sliding pivot joint is spaced apart from the respective arm 54 along the longitudinal axis X. The arm 54 is arranged at a front end of the vehicle seat VS, and the sliding pivot joint is arranged at a rear end of the vehicle seat VS, below the backrest portion 2.

While the vehicle seat VS according to FIGS. 1 and 2 comprises elongate holes 500 engaged by bolts 51 as sliding pivot joints, other forms of sliding pivot joints are also possible.

FIGS. 1 and 2 show the vehicle seat VS in the use position. The easy-entry mechanism 5 is locked by means of a latch 55 (on one side or on both sides of the vehicle seat VS). The latch 55 secures the synchronization tube 52 and the bolts 51 in the use position, i.e., with the bolts 51 located at the rear end of the elongate hole 500. As shown in FIGS. 1 and 2, the latch 55 is in engagement with the synchronization tube 52 (or with the bolt 51) when locking the easy-entry mechanism 5. For displacing the vehicle seat VS into the easy-entry position, the latch 55 is released. For releasing the latch 55, the easy-entry mechanism 5 comprises a release mechanism 56 having a latch release (Bowden) cable 560 (on one side or on both sides of the vehicle seat VS). By operating the release mechanism, the latch 55 is released and brought out of engagement with the synchronization tube 52.

After releasing the latch(es) 55, the bolts 51 may slide or roll along the corresponding elongate hole 500. The arms 54 then pivot around the front brackets 70 and the vehicle seat VS moves forward into the easy-entry position. The parts of the four-bar linkage, therefore, have a double purpose. They are used both for the height adjustment and for the easy-entry mechanism.

Two springs 53 (or in general one or more springs 53) assist the displacement of the seating portion 1 and the backrest portion 2 from the use position into the easy-entry position. The springs 53 pretension the vehicle seat VS along the longitudinal axis X. The springs 53 are extension springs 53, e.g. coil springs, but other types of pre-tensioning elements are also possible. One end of each of the springs 53 is mounted on the synchronization tube 52 (or, alternatively, on a part of the vehicle seat VS that is displaced by the easy-entry mechanism 5 together with the seating portion 1). The respective other end of each of the springs 53 is mounted on a crossbar 43 that is fixedly connected with the upper rails 40 (or, alternatively, with another part fixed with respect to the seat base 7).

When releasing the latch 55 by means of the release mechanism 56, the seating portion 1 and the backrest portion 2 move forward, assisted or driven by the springs 53. This motion may be much faster when compared to conventional easy-entry mechanisms using a powered longitudinal adjuster to provide easy entry.

Figure 6:
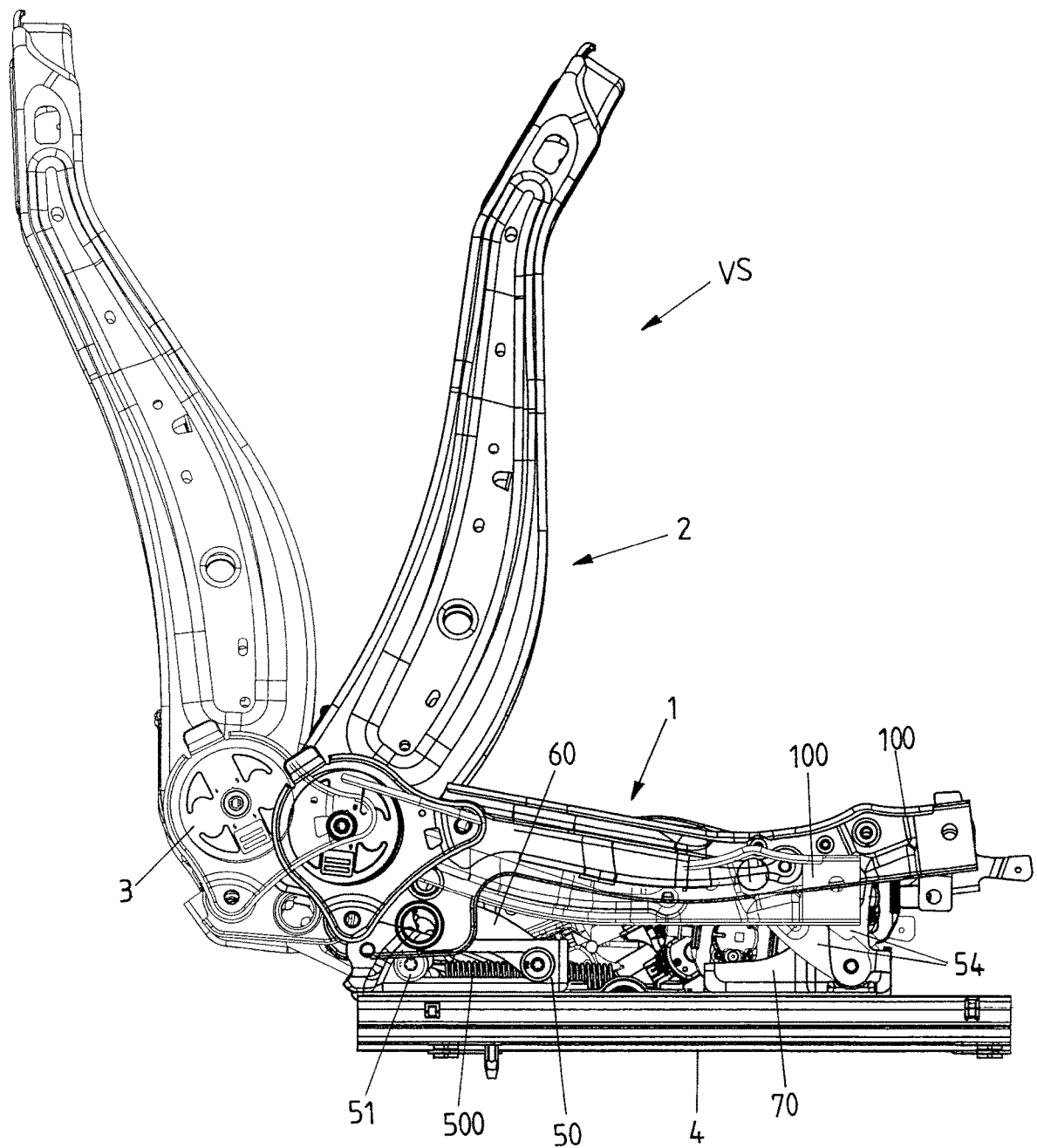
FIG. 6 is a side view on the vehicle seat according to FIG. 1 in a use position and an easy-entry position.

FIG. 6 shows the vehicle seat VS in the use position (shown by thinner lines) and superimposed for comparison, in the easy-entry position (shown by thicker lines).

Figure 3:
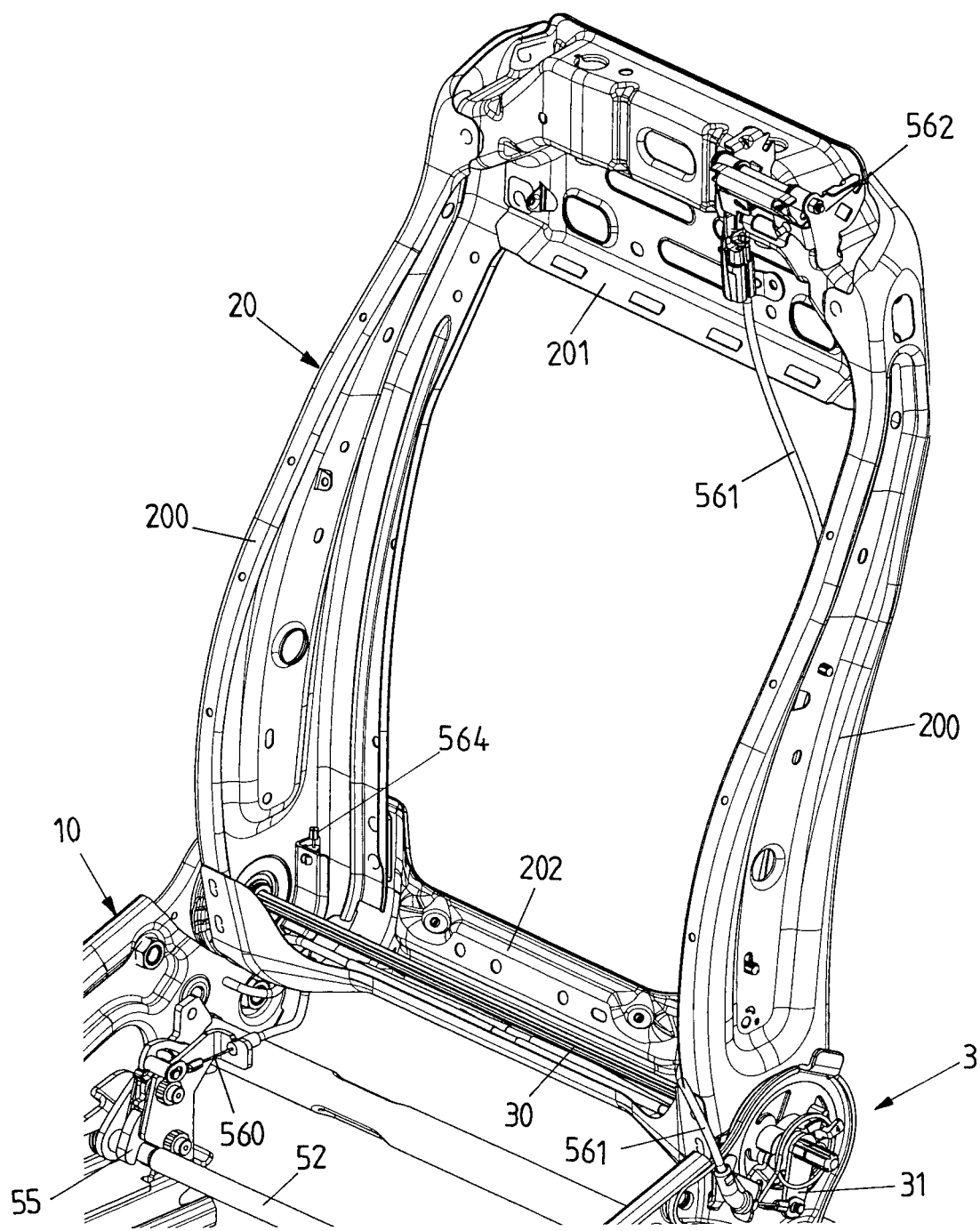
FIG. 3 is an enlarged perspective view on a detail of a release mechanism of the vehicle seat according to FIG. 1.

Turning now to FIG. 3, the release mechanism 56 will be described in more detail. The release mechanism 56 comprises an easy-entry handle 562. The easy-entry handle 562 is arranged at an upper region of the backrest portion 2. According to FIG. 3, the easy-entry handle 562 is mounted on the upper crossbar 201 of the backrest frame 20. The easy-entry handle 562 is operatively connected with one recliner 3 (alternatively with both recliners 3) by means of a recliner release (Bowden) cable 561. By operating the easy-entry handle 562, the recliner release cable 561 is operated; more precisely, is pulled. Operating the recliner release cable 561 activates a release link 31 of the recliner 3 to release the recliner 3. A synchronization rod 30 synchronizes the locked or released state of the operated recliner 3 with the other recliner 3. The synchronization rod 30 is arranged adjacent the lower crossbar 202 of the backrest frame 20. Once released, the recliners 3 allow to pivot the backrest portion 2 forward, i.e., towards the seating portion 1.

The latch release cable 560 is operatively connected with the backrest portion 2. As particularly shown in FIGS. 1 and 2, an end 564 of the latch release cable 560 is fixed on the backrest frame. The end 564 is fixed at a position eccentric from the pivot axis of the recliner 3. By pivoting the backrest portion 2 forward (into a dump position), the latch release cable 560 (on both sides) is operated and pulls the latch 55 out of engagement with the sliding pivot joint, more precisely, out of engagement with the synchronization rod 52 (or bolt 51). The vehicle seat VS may then by transferred into the easy-entry position. By pivoting the backrest portion 2 forward in addition to the displacement of the backrest portion 2 together with the seating portion 1, a larger space may be cleared behind the vehicle seat VS to provide a comfortable and easy entry for occupants.

The use of a sliding pivot joint at the rear part of the seating portion 1 allows to displace the seating and backrest portions 1, 2 forward without lifting the backrest portion 2. Therefore, the vehicle seat VS may be displaced into the easy-entry position without a collision of the backrest portion 2 or a headrest on the backrest portion 2 with a vehicle roof.

In the use position, the arms 54 are inclined backwards (see FIG. 6), in particular pointing towards the backrest portion 2. The upper ends of the arms 54 that are connected with the respective side members 100 are closer to the backrest portion 2 than the lower ends of the arms 54 connected to the front brackets 70 (seen along the longitudinal axis X). When moving into the easy-entry position, the arms 54 lift the front ends of the side members 100 away from the seat base 7 (and the guide rail assembly 4). As shown in in FIG. 6, the arms 54 are arranged substantially vertical in the easy-entry position. As a result, the seat frame (slightly) tilts backwards lowering the backrest portion 2.

Optionally, a headrest may be folded forwards by moving the seating and backrest portions 1, 2 into the easy-entry position.

The easy-entry mechanism 5 according to FIGS. 1-3 is manually operable. In case of an emergency situation, e.g. in case of an accident, the vehicle seat VS allows a quick exit from rear seats by operating the easy-entry handle 562 and tilting the backrest portion 2 forward. For tilting the backrest portion 2 forward, additional springs may be provided. After releasing the latch 55, the springs 53 assist the forward motion. The vehicle seat VS may be transferred into the easy-entry position particularly quickly so as to provide an emergency exit, in particular from rear seats of the vehicle.

Figure 4:
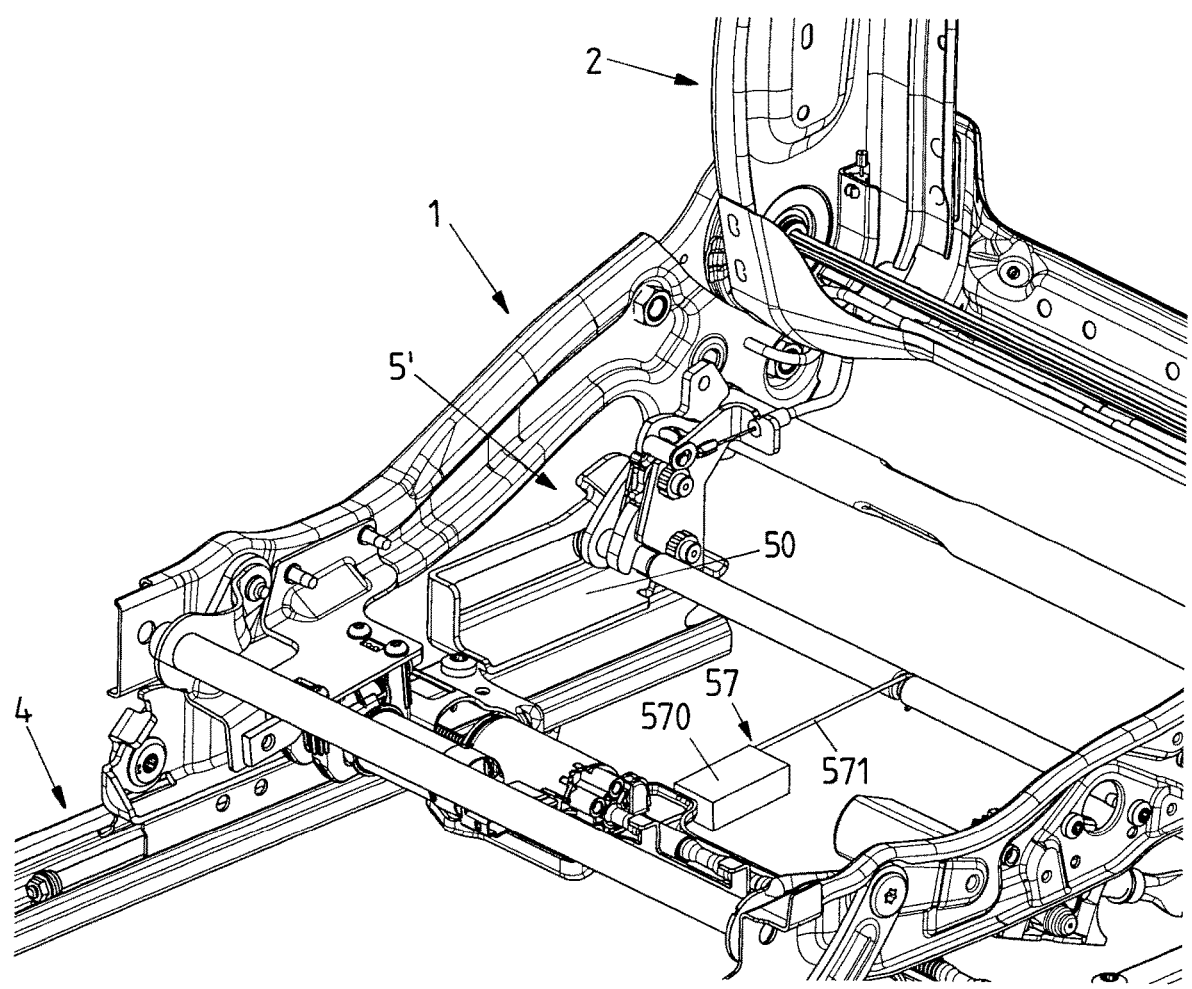
FIG. 4 is a perspective view on a vehicle seat having an easy-entry mechanism being operable by means of a motor.

With reference particularly to FIG. 4, an embodiment of the easy-entry mechanism 5' may comprise a drive mechanism 57 to displace the vehicle seat VS between the use position and the easy-entry position. The drive mechanism 57 may include a drive motor 570 and a spindle 571 instead of, or in addition to springs 53. The drive motor 570 may be an electric motor that may be coupled with or simultaneously or successively activated with another drive motor pivoting the backrest portion 2. The latch 55 may be operable by an actuator instead of or in addition to the manual operation with the easy-entry handle 562.

The drive mechanism 57 may be used to lock the easy-entry mechanism 5 in the use position, in particular by designing the drive mechanism 57 to be self-locking. In this case, an additional latch mechanism, such as the latch 55 may be omitted.

The drive mechanism 57 may be designed as a spindle drive, alternatively as a cam drive, rack and pinion drive or another type of drive mechanism.

The drive motor 570 may be provided with power by the vehicle. In case of a power failure in the vehicle, e.g. due to an accident of the vehicle (such a case may also be referred to a "panic case"), the vehicle seat VS may still be manually operable. For this purpose, the drive mechanism 57 may be designed non-self-locking. Alternatively or in addition, a decoupling mechanism may be provided that decouples one or more drive motors, such as the drive mechanism 57 drive motor 570, when a user manually operates the easy-entry mechanism 5'.

Alternatively or additionally, the drive mechanism 57 may be operable with an additional electric circuit (in addition to the vehicle's power system), in particular with a battery, e.g. a rechargeable battery. By means of the additional electric circuit the vehicle seat VS may be moved between the use position and the easy-entry position by means of the drive mechanism 57, even in case of a power failure of the power system of the vehicle.

Figure 5:
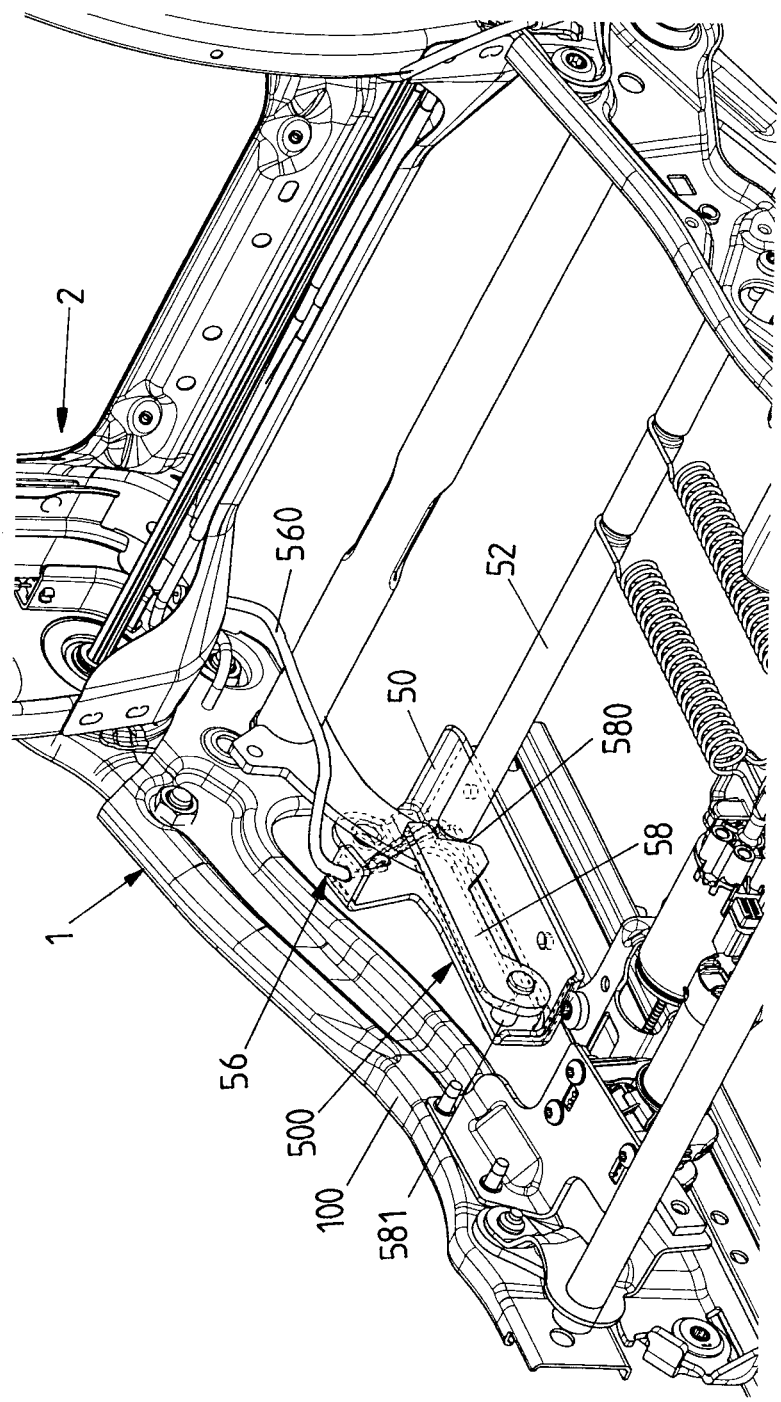
FIG. 5 is a perspective view on a vehicle seat having an easy-entry mechanism with a releasable cam lock.

Turning now to FIG. 5, alternative lock and release mechanisms the easy-entry mechanism 5, 5' according to FIG. 1-3 or 4 are described. The lock mechanism comprises or is formed by a cam lock 58. The cam lock 58 is pivotably mounted on the slotted bracket 50 by means of a pivot joint 581. The pivot joint 581 is arranged at the front end of the elongate hole 500 of the slotted bracket 50. In the use position, the bolt 51 and/or the synchronization tube 52 is located at the rear end of the elongate hole 500, opposite the front end. The cam lock 58 is elongate and, when it locks the sliding pivot joint in the use position, generally extends along the elongate hole 500 or in parallel thereto. The cam lock 58 further comprises a locking surface 580 is in contact with the synchronization tube 52 and/or bolt 51. The locking surface 580 prevents the bolt 51 from moving along the elongate hole 500 when the cam lock 58 is in the locking position as shown in FIG. 5. The cam lock 58 may be pre-tensioned into the locking position, e.g. by means of an elastic element such as a spring, or by its weight. The cam lock 58 is releasable by pivoting the cam lock 58 around the pivot joint 581, e.g. by means of the latch release cable 560 of the release mechanism 56. The latch release cable 560 pulls the locking surface 580 upwards so as to allow the bolt 51 to move along the elongate hole 500. Above the cam lock 58, a sleeve of the latch release cable 560 is supported on an extension of the slotted bracket 50. Both sides of the vehicle seat VS may be provided with a sliding pivot bearing lockable by each one cam lock 58.

It is noted that the release mechanism 56 and a drive motor activation mechanism may be located remote from the vehicle seat VS, or at least parts of the release mechanism 56. For example, the easy-entry handle 562 may be arranged at the vehicle floor or at another part of the vehicle. The easy-entry handle 562 may be equipped with an actuator so that operating the actuator releases the latch 55 or cam lock 58 automatically, and the springs 53 or drive mechanism 57 displace the vehicle seat VS into the easy-entry position.

In all embodiments of the vehicle seat, an optional soft locking or clamping mechanism may be provided to hold the vehicle seat VS in the easy-entry position.

What is claimed is:

1. A vehicle seat comprising:
   a seating portion having a seat frame;
   a backrest portion pivotably supported on the seating portion;
   a seat base for supporting the seating portion; and
   an easy-entry mechanism for displacing the seating portion and the backrest portion with respect to the seat base at least along a longitudinal axis between a use position and an easy-entry position, the easy-entry mechanism comprising:
   at least one arm being pivotably connected to the seat base at a first pivot bearing at a first position location and being pivotably connected with the seat frame at a second pivot bearing; and
   at least one sliding pivot joint arranged at the seat base and supporting the seat frame on the seat base via a link at a second location, the first location being spaced apart from the second location along the longitudinal axis, wherein the sliding pivot joint provides a third pivot bearing with a pivot axis arranged entirely below the seat frame, and wherein the link connects the seat base with the seat frame via a fourth pivot bearing.

2. The vehicle seat of claim 1, wherein the sliding pivot joint comprises a slotted bracket and the first pivot bearing comprises a front bracket, wherein the slotted bracket and the front bracket are mounted on the seat base at a fixed distance from each other.

3. The vehicle seat of claim 1, further comprising a height-adjustment mechanism for adjusting a height of the seat frame with respect to the seat base.

4. The vehicle seat of claim 3, wherein a height-adjustment link of the height-adjustment mechanism connects the sliding pivot joint with the seat frame.

5. The vehicle seat of claim 4, wherein the height-adjustment link is configured to be rotated with respect to the seat base for a height adjustment of the seating portion.

6. A vehicle seat, comprising:
   a seating portion having a seat frame;
   a backrest portion pivotably supported on the seating portion;
   a seat base for supporting the seating portion;
   a guide rail assembly mountable on a vehicle floor for adjusting the longitudinal position of the seating portion and the backrest portion with respect to the vehicle floor, wherein the seat base is coupled on an upper rail of the guide rail assembly, or comprises the upper rail of the guide rail assembly; and an easy-entry mechanism for displacing the seating portion and the backrest portion with respect to the seat base at least along a longitudinal axis between a use position and an easy-entry position, the easy-entry mechanism comprising:
- at least one arm pivotably connected with the seat frame and pivotably connected to the seat base at a first location; and
- at least one sliding pivot joint at a bracket fixed to the upper rail of the guide rail assembly, the sliding pivot joint for supporting the seat frame on the seat base at a second location, the first location being spaced apart from the second location along the longitudinal axis.

7. The vehicle seat of claim 1, wherein the easy-entry mechanism further comprises a releasable latch for restricting and releasing a slidable motion of the slidable pivot joint.

8. The vehicle seat of claim 7, wherein the latch is releasable by pivoting the backrest portion with respect to the seating portion.

9. The vehicle seat of claim 1, wherein the easy-entry mechanism further comprises a releasable cam lock for restricting and releasing a slidable motion of the slidable pivot joint.

10. The vehicle seat of claim 9, wherein the cam lock is releasable by pivoting the backrest portion with respect to the seating portion.

11. The vehicle seat of claim 1, wherein a recliner pivotably connects the backrest portion with the seating portion.

12. The vehicle seat of claim 11, wherein the sliding pivot joint is located closer to the recliner than the arm.

13. The vehicle seat of claim 11, wherein the backrest portion may be adjusted with respect to the seating portion via the recliner without displacing the seating portion with respect to the seat base.

14. The vehicle seat of claim 11, wherein the recliner includes a first recliner part fixedly connected with the seat frame and a second recliner part fixedly connected to a backrest frame of the backrest portion, wherein the first recliner part and the second recliner part are rotataby mounted to one another.

15. The vehicle seat of claim 14, wherein the first recliner part is mounted to a frame member of the seat frame.

16. The vehicle seat of claim 1, wherein the easy-entry mechanism further comprises a spring pre-tensioning the vehicle seat into the easy-entry position.

17. The vehicle seat of claim 1, wherein the seat frame comprises two frame members being laterally spaced from one another and connected with each other by rods.

18. The vehicle seat of claim 17, further comprising a second arm, the first and second arms being pivotably mounted on a respective one of the frame members and on the seat base, and a second sliding pivot joint for supporting the seat frame on the seat base.

19. A vehicle seat, comprising:
- a seating portion having a seat frame with at least one frame member;
- a seat base for supporting the seating portion;
- a height-adjustment mechanism for adjusting a height of the seat frame with respect to the seat base; and
- an easy-entry mechanism for displacing the seating portion with respect to the seat base at least along a longitudinal axis between a use position and an easy-entry position, the easy-entry mechanism comprising at least one sliding pivot joint arranged at the seat base and supporting the seat frame on the seat base, wherein the at least one frame member is connected to the at least one sliding pivot joint via a height-adjustment link of the height-adjustment mechanism, the height-adjustment link being rotatably mounted on the seat base of the sliding pivot joint.

* * * * *